United States Patent
Feeley

(10) Patent No.: US 8,589,223 B2
(45) Date of Patent: Nov. 19, 2013

(54) METHOD AND SYSTEM FOR OFFERING ADVERTISING SERVICES

(75) Inventor: Michael A. Feeley, Amherst, NY (US)

(73) Assignee: 680 Media, Inc., Naples, FL (US)

( * ) Notice: Subject to any disclaimer, the term of this patent is extended or adjusted under 35 U.S.C. 154(b) by 2885 days.

(21) Appl. No.: 10/294,144

(22) Filed: Nov. 14, 2002

(65) Prior Publication Data

US 2004/0098302 A1    May 20, 2004

(51) Int. Cl.
*G06Q 30/00* (2012.01)

(52) U.S. Cl.
USPC ................................. 705/14.16

(58) Field of Classification Search
USPC ............................................. 705/14
See application file for complete search history.

(56) References Cited

U.S. PATENT DOCUMENTS

| | | | | |
|---|---|---|---|---|
| 5,930,474 A * | 7/1999 | Dunworth et al. | ............ | 709/217 |
| 6,385,592 B1 * | 5/2002 | Angles et al. | ................ | 705/14 |
| 6,487,538 B1 * | 11/2002 | Gupta et al. | .................... | 705/14 |
| 6,629,135 B1 * | 9/2003 | Ross et al. | ..................... | 709/218 |
| 6,968,513 B1 * | 11/2005 | Rinebold et al. | ............. | 715/854 |
| 7,054,857 B2 * | 5/2006 | Cunningham et al. | ............ | 707/3 |
| 7,136,875 B2 * | 11/2006 | Anderson et al. | .......... | 707/104.1 |
| 2003/0033292 A1 * | 2/2003 | Meisel et al. | ..................... | 707/3 |
| 2003/0212648 A1 * | 11/2003 | Cunningham et al. | ............ | 707/1 |
| 2005/0203835 A1 * | 9/2005 | Nhaissi et al. | .................. | 705/39 |

* cited by examiner

*Primary Examiner* — Colleen Hoar

(74) *Attorney, Agent, or Firm* — Phillips Lytle LLP; David L. Principe

(57) ABSTRACT

A method of offering advertising services to a client for advertising a client website on the Internet comprises the steps of identifying a web host, the web host receiving client information for establishing a client account with said web host for hosting the client website; cooperating with the web host to prompt the client as to whether an advertising account is desired; and, if an advertising account is desired, using the client information received by the web host to establish the advertising account. The invention also covers a related computer system for performing the method.

14 Claims, 5 Drawing Sheets

METHOD AND SYSTEM FOR OFFERING ADVERTISING SERVICES

FIELD OF THE INVENTION

The present invention relates generally to electronic commerce conducted over the Internet, and more particularly to a business method by which a search engine service or other advertiser service can register new advertising accounts in cooperation with a web host.

BACKGROUND OF THE INVENTION

The transfer of information over computer networks has become an increasingly important means by which institutions, corporations, and individuals do business. Computer networks have grown over the years from independent and isolated entities established to serve the needs of a single group into vast internets which interconnect disparate physical networks and allow them to function as a coordinated system. Currently, the largest computer network in existence is the Internet. The Internet is a worldwide interconnection of computer networks that communicate using a common protocol. Millions of computers, from low end personal computers to high end super computers, are connected to the Internet.

The Internet has emerged as a large community of electronically connected users located around the world who readily and regularly exchange information. The Internet continues to serve its original purposes of providing access to and exchange of information among government agencies, laboratories, and universities for research and education. In addition, the Internet has rapidly become a global electronic marketplace of goods and services. This transformation of the Internet into a global marketplace was driven in large part by the introduction of an information system known as the World Wide Web ("the web"). The web is a unique distributed database designed to give wide access to a large universe of documents. The database records of the web are in the form of documents known as "pages", with one or more related pages forming a "website". Web pages reside on web servers and are accessible via the Internet. The web is therefore a vast database of information dispersed across countless individual computer systems that is constantly changing and has no recognizable organization. Computers connected to the Internet may access the web pages via a program known as a browser, which typically has a graphical user interface. One powerful technique supported by web browsers is known as hyperlinking, which permits web page authors to create links to other web pages which users can then retrieve by using simple point-and-click commands on the web browser.

Web pages may be constructed in any one of a variety of formatting conventions, such as Hyper Text Markup Language (HTML), and may include multimedia information content such as graphics, audio, and moving pictures. Any person with a computer and a connection to the Internet may access any publicly accessible page posted on the web. Thus, a presence on the World Wide Web has the capability to introduce a worldwide base of consumers to businesses, individuals, and institutions seeking to advertise their products and services to potential customers. Furthermore, the ever increasing sophistication in the design of web pages, made possible by the exponential increase in data transmission rates and computer processing speeds, makes the web an increasingly attractive medium for advertising and other business purposes, as well as for the free flow of information. The widely recognized importance of gaining a presence on the World Wide Web has led to the proliferation of "web hosts" which provide services and web servers for establishing and maintaining web pages and websites for clients. Thus, for example, a business client setting up a commercial website would contact a web host to host the website, with the web host charging an initial fee and monthly subscription fee. The web host typically has its own website through enabling clients to sign-up for web hosting services over the Internet.

The availability of powerful new tools that facilitate the development and distribution of Internet content has led to a proliferation of information, products, and services offered on the Internet and dramatic growth in the number of consumers using the Internet. As a result, directories and search engines have been developed to index and search the information available on the web and thereby help Internet users locate information of interest. These search services enable consumers to search the Internet for a listing of websites or web pages based on a specific topic, product, or service of interest.

Search services are, after e-mail, the most frequently used tool on the Internet. As a result, websites providing search services have offered advertisers significant reach into the Internet audience and have given advertisers the opportunity to target consumer interests based on keyword or topical search requests. In a web-based search on an Internet search engine, a user enters a search term comprising one or more keywords, which the search engine then uses to generate a listing of web pages that the user may access via a hyperlink. Many search engines and website directories rely upon processes for assigning results to keywords that often generate irrelevant search results. The automated search technology that drives many search engines implements complex database search algorithms that select and rank web pages based on multiple criteria such as keyword density and keyword location. In addition, search engines that use automated search technology to catalog search results generally rely on invisible website descriptions, or "meta tags", that are authored by website promoters. Website owners may freely tag their sites as they choose. Consequently, some website promoters insert popular search terms into their website meta tags that are not relevant to the website, because by doing so they may attract additional consumer attention at little to no marginal cost. Finally, many different websites can have similar meta tags, and search engines of the type described above are simply not equipped to prioritize results in accordance with consumers' preferences.

Search engines and website directories may also rely on the manual efforts of limited editorial staffs to review web page information. Because comprehensive manual review and indexing of an unpredictable, randomly updated database such as the web is an impossible task, search engine results are often incomplete or out-of-date. Moreover, as the volume and diversity of Internet content has grown, on many popular web search sites, consumers must frequently click-through multiple branches of a hierarchical directory to locate websites responsive to their search request, a process that is slow and unwieldy from the consumer's standpoint.

Furthermore, the use of banner advertising for generating website traffic follows traditional advertising approaches and fails to utilize the unique attributes of the Internet. In the banner advertising model, website promoters seeking to promote and increase their web exposure often purchase space on the pages of popular commercial websites. The website promoters usually fill this space with a colorful graphic, known as a banner, advertising their own website. The banner may act as a hyperlink to the promoter's site. Like traditional advertising, banner advertising on the Internet is typically priced on an impression basis with advertisers paying for exposures to potential consumers. Banners may be displayed at every page access, or, on search engines, may be targeted to search terms. Nonetheless, impression-based advertising inefficiently exploits the Internet's direct marketing potential, as the click-through rate, the rate of consumer visits a banner generates to the promoter's website, may be quite low. Website promoters are therefore paying for exposure to many consumers who are not interested in the product or service being promoted, as most visitors to a website seek specific information and may not be interested in the information announced in the banner. Likewise, the banner often fails to reach interested individuals, since the banner is not generally searchable by search engines and the interested persons may not know where on the web to view the banner.

One approach that has emerged to help web page owners target their web exposure and distribute information to the attention of interested consumers on a current and comprehensive basis is the "bid-for-position" search engine (also known as "bid-for-location" and "pay-per-click" search engine). Under this approach, website owners or promoters maintain an account with the bid-for-position search engine and register respective competitive bid amounts on keywords related to web page or website content. Search results are returned by the bid-for-position search engine in an order determined by the competitive bids, with the website of the high bidder for the searched keyword being listed first and so on. Accordingly, under the bid-for-position model, website promoters can control the placement of their website link in search result listings so that their link is prominent in searches that are relevant to the content of their website. Because advertisers and promoters must pay for each click-through referral coming from the search result listing generated by the bid-for-position search engine, they have an incentive to select and bid on those search keywords that are most relevant to their website offerings and content. The higher an advertiser's position on a search result list, the higher likelihood of a "referral"; that is, the higher the likelihood that a consumer will be referred to the advertiser's website through the search result list. The openness of this advertising marketplace is further facilitated by publicly displaying, to consumers and other advertisers, the price bid by an advertiser on a particular search result listing.

At present, a website owner who signs up as a client of a web host may or may not be aware of the benefits of registering with search engines, particularly bid-for-position search engines, to increase traffic of interested consumers to its website. Moreover, if the website owner does register with a search engine, much of the same client information provided to the web host at the time of sign-up must again be provided to the search engine. Similar to web hosts, search engines have websites for signing up clients, in this case to advertising accounts.

Thus, it would be beneficial to clients to offer advertising services for promoting the client's website at the time the client signs up for web hosting services, and to streamline the sign-up process for the client so that signing up for advertising services involves little or no extra work.

SUMMARY OF THE INVENTION

The present invention is embodied by a method for offering advertising services to a client for advertising a client website on the Internet. The method comprises the steps of identifying a web host receiving client information for establishing a client account with the web host for hosting the client website, cooperating with the web host to prompt the client as to whether an advertising account is desired, and, if an advertising account is desired, using the client information received by the web host to establish the advertising account. Under a currently proposed implementation of the method, the web host receives the client information through a client sign-up form on its web host website, and the sign-up form includes an input object, such as a checkbox, through which the client indicates whether an advertising account is desired. Also under a currently proposed implementation of the method, the search engine shares revenue it receives from the client for providing advertising services with the web host.

The method of the present invention may also include the further steps of assigning a username and a password to the advertising account and informing the client, preferably by e-mail, of the username and password.

The present invention also encompasses a computer system for implementing a method as summarized above, the computer system having stored thereon a search engine website and an advertising account database associated with the search engine website, and programming code for conditionally opening an advertising account for promoting the client website and writing client information to the advertising account database, wherein the client information is originally entered into the computer system through a website other than the search engine website.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
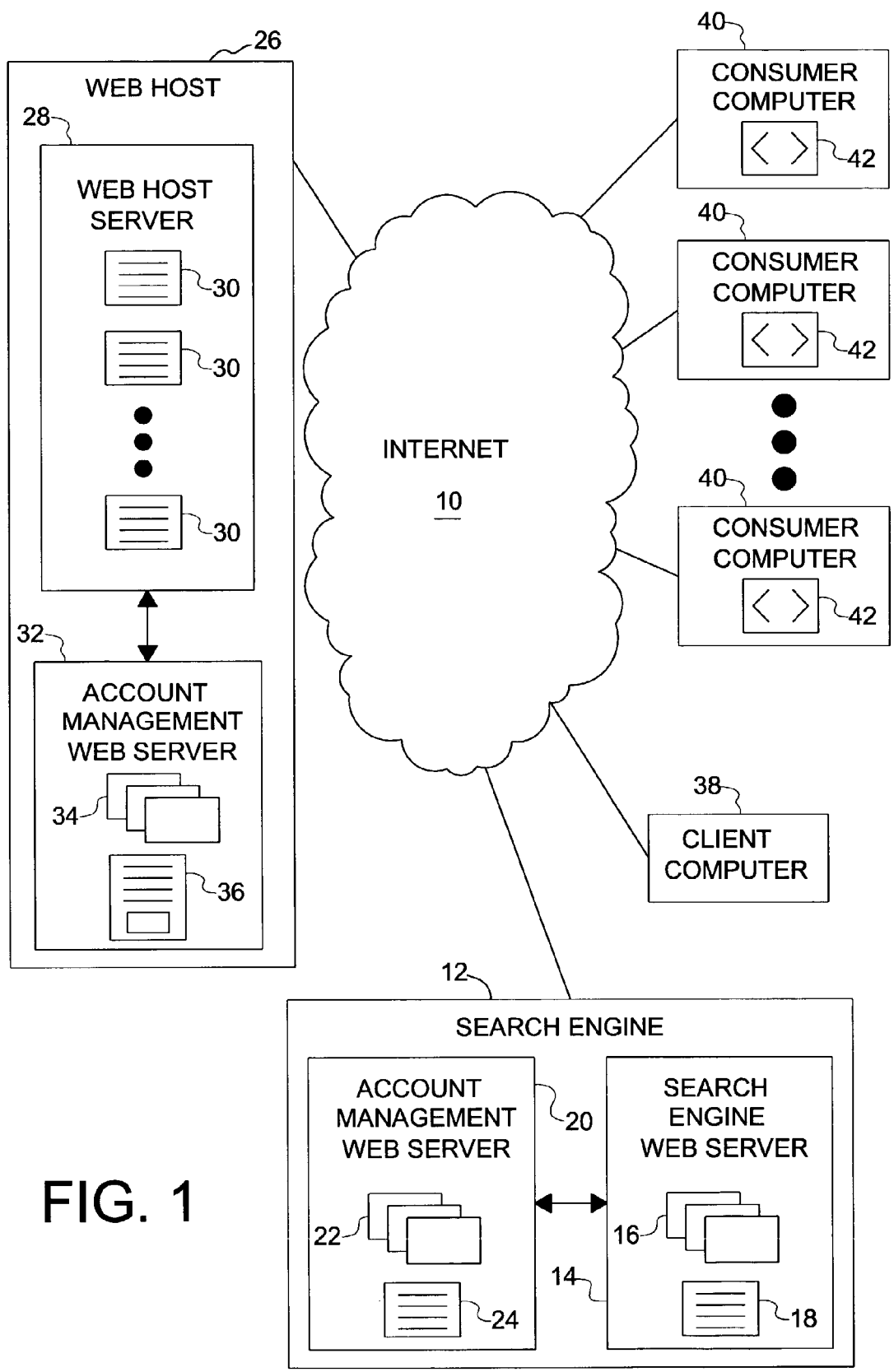
FIG. 1 is a schematic diagram of a computer network system embodying the present invention.

Referring initially to FIG. 1 of the drawings, a computer network system is shown schematically as including a bid-for-position search engine 12, a web host 26, a client computer 38, and a plurality of consumer computers 40, all of which are interconnected through the Internet 10. Search engine 12 is shown as having a search engine web server 14 and an account management web server 20 connected to the search engine web server to exchange information therewith. Search engine web server 14 stores a search engine database 16 and programming for generating a search engine web page 18 on which search results are displayed. Account management web server 20 stores an accounts database 22 and programming for generating a secure account web page 24. Web host 26 includes a web host server 28 and an account management web server 32 connected to web host server 28 to exchange information therewith. Web host server 28 stores programming for generating client websites 30 that promote or offer goods and/or services, or provide other information which can be accessed by members of the public using consumer computers 40 connected to Internet 10 and having executable browser software 42 stored thereon. As will be appreciated, a client using client computer 38 can sign-up through web host 26 to establish a website 30, and can also open an advertising account with search engine 12. Members of the public using consumer computers 40 may visit the search engine web page 18 or an affiliate web page to run a keyword search that returns a list of matching links to various websites 30 from search engine database 16.

Figure 2:
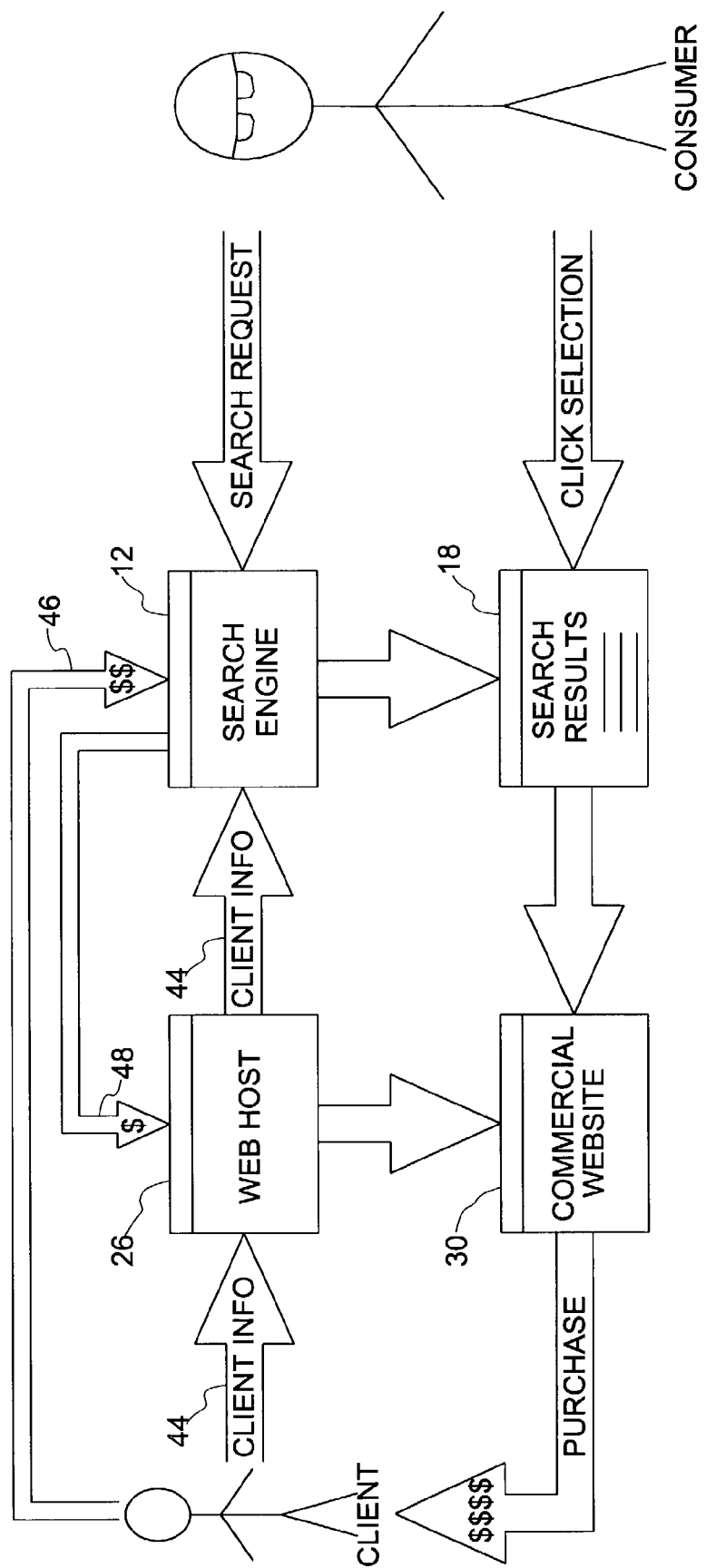
FIG. 2 is a schematic diagram illustrating a business method in accordance with the present invention.
Figure 3:
FIG. 3 shows a client sign-up form, associated with a web host website, for practicing the present invention.

FIG. 2 illustrates a business method according to the present invention by which an advertising service provider, such as search engine 12, can offer advertising services to a client for advertising a client website on the Internet. In general terms, the search engine 12 identifies a web host 26 that receives client information 44 incident to signing up a new client, and cooperates with the web host to prompt the client as to whether an advertising account is desired. As shown in FIG. 3, by way of non-limiting example, search engine 12 cooperates with web host 26 by placing a subform 50 on the web host's new client sign-up form on secure web host client account web page 36. The subform 50 includes an advertising account prompt message 52, an input object in the form of a check box 54, a hypertext link 56 to the website of search engine 12, and a continue command button 58. If the client clicks to place a check in check box 54 and then clicks continue command button 58, then client information 44 will be used by search engine 12 to open a new advertising account, with the client information being written to search engine advertising account database 22 (FIG. 1). As used herein, the term "client information" is intended to be broadly construed, and may include name, address, and telephone information, e-mail address information, information for identifying the client's website, and credit card information. It is also noted that the term "client information" as used herein refers only to that information received by the web host and used to open an advertising account, it being realized that possibly not all the information provided by the client to the web host is necessary for opening an advertising account.

Referring again to FIG. 2, the present invention brings commercial benefits to all parties involved. The client increases traffic to its commercial website 30 to boost sales revenue, the bid-for-position search engine 12 receives revenue 46 from the client when a consumer "clicks through" to commercial website 30 from a list of search results provided by the search engine, and web host 30 receives a shared portion 48 of the revenue 46 in exchange for its cooperation with search engine 12.

Figure 4:
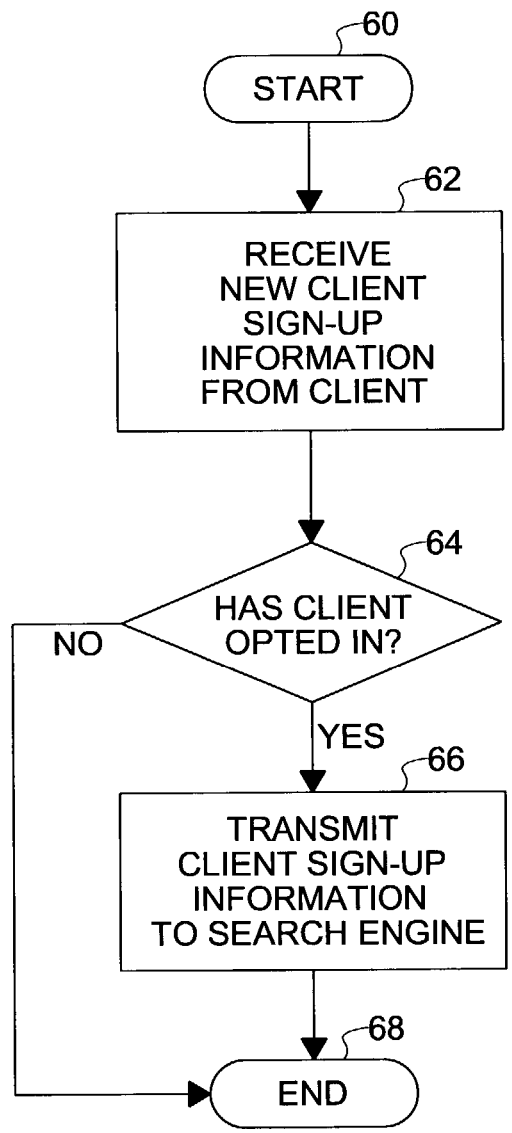
FIG. 4 is a flow chart illustrating programming code execution associated with a web host website in accordance with an embodiment of the present invention.
Figure 5:
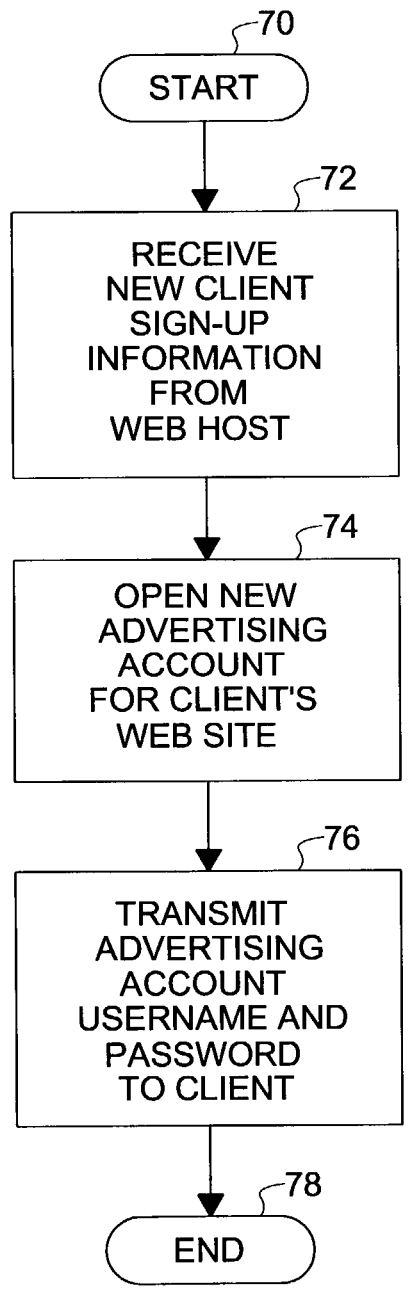
FIG. 5 is a flow chart illustrating programming code execution associated with a search engine website in accordance with an embodiment of the present invention.

The flowcharts of FIGS. 4 and 5 show generally the flow of programming code for implementing the method of the present invention. FIG. 4 relates to executable programming code stored and run from the system of web host 26. After start block 60, new client sign-up information is received through a form on web page 36 under block 62, and a query 64 is run to determine whether the client has indicated a desire for an advertising account by checking box 54. If so, client information 44 is transmitted via the Internet 10 to the system of search engine 12 pursuant to block 66. If not, execution stops at block 68.

FIG. 5 relates to executable programming code stored and run from the system of search engine 12. After start block 70, the client information transmitted by the web host in accordance with block 66 of FIG. 4 is received by the search engine in block 72 and a new advertising account is opened for promoting the client's website under block 74. A username and password are preferably assigned to the new advertising account, and this information is sent to the client by e-mail in accordance with block 76. Such an e-mail may be routed directly from search engine 12 to client computer 38, or from search engine 12 to web host 26 to client computer 38. Execution terminates at block 78.

In order to induce cooperation from web hosts, revenue sharing can be structured to reward the web host with a higher percentage of an initial advertising account deposit, in a manner akin to a "finder's fee", and a lower percentage of subsequent advertising account deposits by the client.

To induce clients to opt-in for an advertising account, the advertising account can initially be in the form of a free "trial account" wherein search engine 12 credits the account with an initial amount so the client can evaluate the effectiveness of the advertising services.

As will be appreciated from the foregoing description, the benefits provided by the method and system of the present invention can be realized with existing hardware and relatively simple programming code.

LIST OF REFERENCE NUMERALS 10 internet
12 search engine
14 search engine web server
16 search engine database
18 search engine web page
20 search engine account management web server
22 search engine advertising account database
24 secure advertising account web page
26 web host
28 web host web server
30 client website
32 web host account management web server
34 web host client account database
36 secure web host client account web page
38 client computer
40 consumer computer
42 browser
44 client information
46 advertising revenue to search engine
48 shared revenue to web host
50 advertising account subform
52 advertising account prompt message
54 advertising account check box
56 hypertext link to search engine website
58 continue command button
60-78 programming code execution blocks

What is claimed is:

1. A method of offering advertising services to a client for advertising a client website on the Internet, said method comprising the steps of:
   providing an advertising system of a first party, the advertising system having an advertising account database associated with the advertising system;
   cooperating with a web host of a second party to have said web host prompt said client as to whether an advertising account on the advertising system is desired at the time of establishing a client account with said web host for hosting a new client website;
   if an advertising account is desired, receiving, by the advertising system, the client information from the web host; and
   writing the client information received from the web host to the advertising account database of the advertising system to establish said advertising account.

2. The method according to claim 1, wherein said web host receives said client information through a web host website having a client sign-up form.

3. The method according to claim 2, wherein said web host website includes an input object through which said client indicates whether an advertising account is desired.

4. The method according to claim 3, wherein said client sign-up form includes said input object.

5. The method according to claim 3, wherein said input object is a checkbox.

6. The method according to claim 1, further comprising the step of sharing revenue generated by said advertising account with said web host.

7. The method according to claim 1, further comprising the step of assigning a username and a password to said advertising account.

8. The method according to claim 7, further comprising the step of informing said client of said username and said password.

9. The method according to claim 8, wherein said step of informing said client is performed by way of electronic mail.

10. The method according to claim 1, wherein said advertising account is initially a free trial account.

11. A system for offering advertising services to a client for advertising a client website on the Internet, said system comprising:
 a computer system having stored thereon:
  a search engine website and an advertising account database associated with said search engine website;
 the system being programmed to:
  receive client information from a web host, the client information being sent by the web host at the time of establishing a client account with said web host for hosting a new client website; and
  open an advertising account for promoting the client website by writing the received client information to the advertising account database.

12. The system according to claim 11, wherein said computer system further stores programming code for prompting said client from said web host website as to whether an advertising account is desired, wherein said advertising account is opened and said client information is written to said advertising account database only of said client desires an advertising account.

13. The system according to claim 11, wherein said computer system further stores programming code for assigning a username and a password to said advertising account.

14. The system according to claim 13, wherein said computer system further stores programming code for sending an electronic mail message informing said client of said username and said password.

* * * * *